(12) United States Patent
King

(10) Patent No.: US 8,276,009 B2
(45) Date of Patent: Sep. 25, 2012

(54) OPERATING SYSTEM (OS) VIRTUALISATION AND PROCESSOR UTILIZATION THRESHOLDS FOR MINIMIZING POWER CONSUMPTION IN MOBILE PHONES

(75) Inventor: James King, Wokingham (GB)

(73) Assignee: Broadcom Corporation, Irvine, CA (US)

( * ) Notice: Subject to any disclaimer, the term of this patent is extended or adjusted under 35 U.S.C. 154(b) by 927 days.

(21) Appl. No.: 12/205,012

(22) Filed: Sep. 5, 2008

(65) Prior Publication Data

US 2010/0064154 A1    Mar. 11, 2010

(51) Int. Cl.
    *G06F 1/32* (2006.01)
(52) U.S. Cl. ........................ 713/320; 713/300
(58) Field of Classification Search .......... 713/300, 713/320, 324
    See application file for complete search history.

(56) References Cited

U.S. PATENT DOCUMENTS

| | | | |
|---|---|---|---|
| 6,065,123 A | 5/2000 | Chou et al. | |
| 6,289,227 B1 | 9/2001 | Shi | |
| 6,289,369 B1 | 9/2001 | Sundaresan | |
| 6,865,738 B2 | 3/2005 | Mathiske et al. | |
| 7,430,673 B2 | 9/2008 | Kardach et al. | |
| 7,941,657 B2 | 5/2011 | Cromer et al. | |
| 2003/0041090 A1 | 2/2003 | Armstrong et al. | |
| 2003/0115495 A1* | 6/2003 | Rawson, III | 713/324 |
| 2004/0111596 A1* | 6/2004 | Rawson, III | 713/1 |
| 2004/0128663 A1 | 7/2004 | Rotem | |
| 2004/0215987 A1* | 10/2004 | Farkas et al. | 713/300 |
| 2006/0026407 A1 | 2/2006 | Chauvel | |
| 2006/0095913 A1 | 5/2006 | Bodas et al. | |
| 2007/0037610 A1 | 2/2007 | Logan | |
| 2007/0226795 A1 | 9/2007 | Conti et al. | |
| 2007/0250838 A1* | 10/2007 | Belady et al. | 718/105 |
| 2008/0022283 A1 | 1/2008 | Krieger et al. | |

OTHER PUBLICATIONS

TRANGO, http://www.trango-vp.com, Downloaded from website on Apr. 10, 2008.
Cox, Landon P. et al., Pocket Hypervisors: Opportunities and Challenges, 2007, IEEE pp. 46-48,50.
Alpern, B, et al., The Jalapeno virtual machine, 2000, IBM Systems Journal, vol. 39, No. 1 pp. 211-238.
Shaylor, Nik et al., the Java Virtual Machine Architecture for Very Small Devices, 2003, ACM, LCTES '03, pp. 34-41.

* cited by examiner

*Primary Examiner* — Paul Yanchus, III
(74) *Attorney, Agent, or Firm* — Weiss & Arons LLP

(57) ABSTRACT

A mobile phone that uses OS virtualization for minimizing power consumption in mobile phones is provided. Apparatus and methods may involve conserving processor power in a mobile phone according to the invention may include the following steps. A first step may be awakening a first processing core from a low power state in response to a first operating system (OS) thread. A following step may include processing the first OS thread using the first processing core. A next step may include determining whether utilization of the first processing core over a first time period has exceeded a predetermined threshold. The method may also include awakening a second processing core from a low power consumption state if utilization of the first processing core over a first time period has exceeded a predetermined threshold.

19 Claims, 10 Drawing Sheets

OPERATING SYSTEM (OS) VIRTUALISATION AND PROCESSOR UTILIZATION THRESHOLDS FOR MINIMIZING POWER CONSUMPTION IN MOBILE PHONES

FIELD OF TECHNOLOGY

This invention relates to techniques used to minimize power consumption in a mobile phone. More particularly this invention relates to reducing idle time power consumption in a mobile phone.

BACKGROUND OF THE INVENTION

In a mobile phone, it is important to preserve power as much as possible to maximize battery life. To preserve power, each operating system ("OS") resident in the mobile phone looks for idle time when there is no processing to be done and attempts to put its associated hardware to "sleep"—i.e., to inactivate the hardware to the extent possible, so that the OS consumes less or no power during that idle time.

OSes in a mobile phone typically control the application stack, the modem, the Wi-Fi, the Bluetooth, the Mobile TV, just to name a selected portion of the applications controlled by OSes in a cell phone. During idle times, such OSes typically perform periodic tasks. Before going idle—"to sleep"—the OSes schedule themselves to wake up for these periodic tasks. These periodic tasks may include, for example, the modem stack checking the paging channel for incoming calls and the user interface ("UI") OS checking the battery status and updating the clock on the display. Often these tasks are dependent on waking another of the OSes—for example the UI OS may need to wake up the modem OS to get the current mobile signal strength to update the cell phone display.

Under normal usage, these regular wake-up events consume a majority of a mobile phone's battery. A large proportion of that power consumption happens during the actual wake-up and going back to sleep mechanism for each of the processing cores associated with each OS.

Accordingly, any mechanism that can be implemented to reduce this power consumption is desirable.

SUMMARY OF THE INVENTION

A system and/or method for reducing power consumption of a mobile phone, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
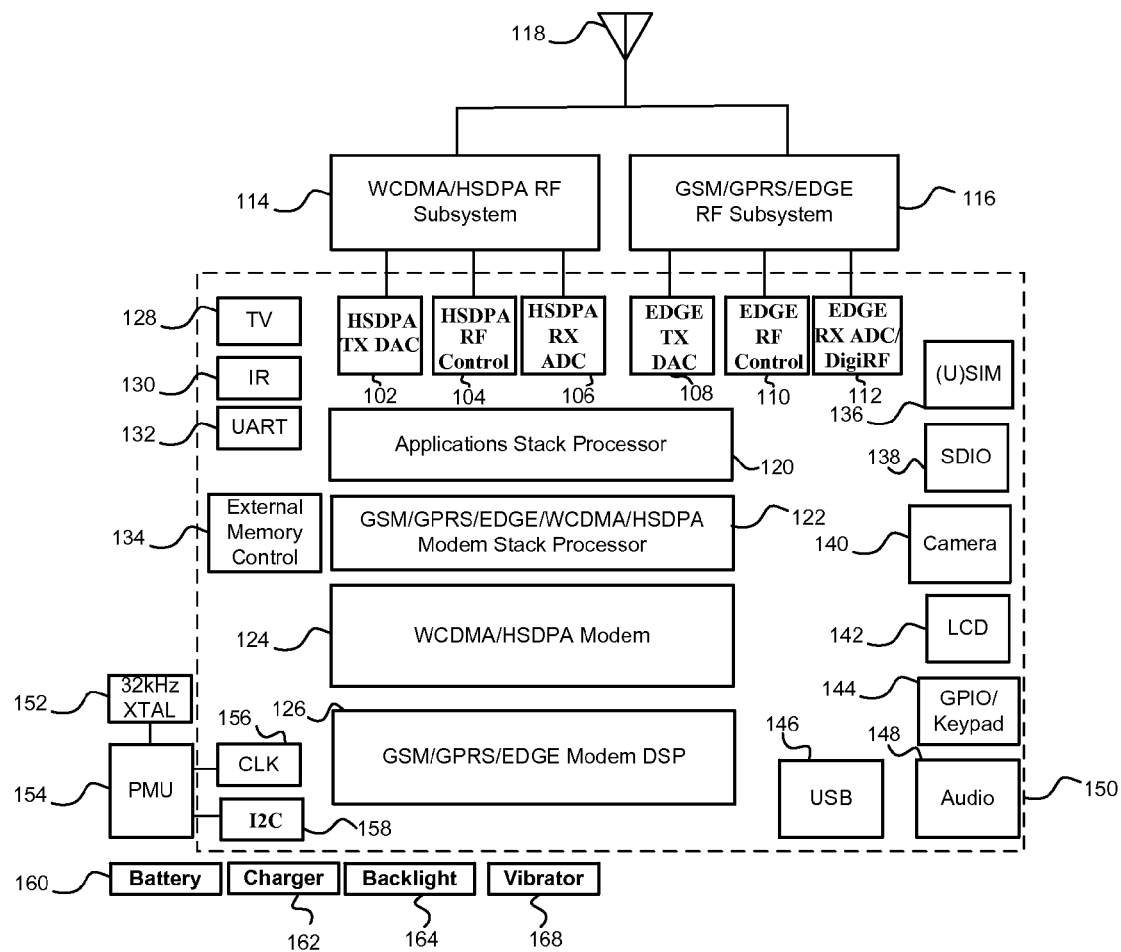
FIG. 1 shows a schematic diagram of a conventional cell phone.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Increasingly mobile phones have more than one processing core—i.e., the hardware typically referred to as the central processing unit ("CPU"). Particularly, "smart-phones" that contain fully-featured user interface ("UI") operating systems ("OS") such as Windows Mobile™, Symbian™ or Linux™, implement multiple processing cores. A typical smart-phone will have one silicon-chip based hardware core running the UI OS, another core running the modem stack OS and possibly other cores running other peripheral software stacks such as GPS, WiFi, Mobile TV, multimedia, Bluetooth, etc. For the purposes of this application the term stack may be defined as a software component resident in a device memory that preferably relates to a particular software application. Such exemplary software applications that may be supported by their own dedicated stack include a user interface application or a mobile communications data processing stack. A stack can contain its own dedicated OS.

The majority of functions performed on a mobile phone only use a small fraction of the total processing capability of the cores, but it is necessary to have a large amount of processing capability to support a small number of computation intensive functions that are required in the phone. Examples of these may include high speed data transfer and handling of complex video processing. For most phones it is necessary to have a greater amount of UI processing than modem processing to provide a good user experience associated with the UI tasks. Therefore it is normal to have one core dedicated to the UI stack that runs much faster and consumes much more power than the other cores.

Currently the low processor intensive tasks such as making a voice call or listening to a MP3 will generally run software from both the modem and OS stacks to provide the service and will therefore have both processing cores awake and consuming power albeit they may be able to sleep for small periods during that processing.

The present invention is based around OS virtualization or "hypervisor" technology. A hypervisor is software that runs (as an operating system control program) directly on a given hardware platform. Consequently, 'guest' OS(es) then run at a second level above the hardware whereby all access to the hardware is controlled by the hypervisor software. Specifically, the details of the hardware are effectively abstracted by the hypervisor code and each OS runs in a virtual machine. In this way it is possible to allow two or more OSes to run on a single processing core with each perceiving that it is the only OS running on that processing core. In alternative embodiments of the invention, suitable software which may work instead of a hypervisor may also be implemented to provide OS virtualization. Nevertheless, for the sake of simplicity, the application describes the invention in terms of hypervisor utilization. But, it should be understood that the invention is not limited only to hypervisor technology to virtualize an OS.

With a hypervisor, the OSes run in a virtual environment whereby access to memory, processor scheduling, etc. are all handled by the hypervisor. In such an environment, it is relatively less complex to change the underlying hardware without having to change the OS code. One such conventional application of hypervisors that adapt the OS/processing core relationship without changing the OS is to allow a single OS to run on multiple processing cores (which may all share access to a single memory system). Each core runs an instance of the hypervisor and the respective hypervisor instances communicate with each other to schedule the OS threads across the processing cores—each thread of the OS oblivious to the fact that the threads are not all running on a single processor. Importantly, this process of running an OS over a hypervisor in a virtual machine can be done for 3rd party OSes such as Windows Mobile and Linux without having to make changes within the 3rd party software.

One embodiment of this invention may be implemented in a mobile phone Application-Specific Integrated Circuit ("ASIC") containing two ARM™ processing cores—e.g., one core for the modem stack and one core for the UI OS. Each core has the same access to all the hardware peripherals (as in the existing BCM2152, BCM2153 and BCM21551 manufactured by Broadcom Corporation™, of Irvine, Calif.). If each of the OSes are ported to work over a hypervisor that runs on each processing core then the OSes function as before. If one of the cores—e.g., the lowest power one—is chosen as a periodic wake-up chip, the respective hypervisors can be configured to run the periodic wake-up threads on that core only. Consequently, only one processing core needs to be powered up during idle periods. Thus, as long as the software instructs the UI OS wake-ups to be concurrent with modem OS wake-ups, this approximately halves the power consumption of wake-up and sleep functionality because only one core is being awakened rather than two cores. The power saving is realized because the power consumption associated with the waking and putting to sleep of the second core is eliminated.

A further advantage to this system is that the non-waking core can safely be put in a very deep sleep—i.e., a relatively very low power consumption state—possibly saving more power even if there is an associated wake-up latency—i.e., the amount of time it takes for a core to transition from a sleep state to an operational state—as the other core can handle processing until it is awake. Also any inter-OS communication required during the periodic wake-ups may have a lower latency as the threads will be running on the same awake core—thus minimizing the duration of the wake-up and reducing power consumption.

Systems and methods according to the invention could be implemented, for example, on the BCM2152, BCM2153 and BCM21551 all of which have a modem stack core and a UI OS core and all of which have equal access to memory and peripherals from both cores.

Existing hypervisor technology works with many conventional UI OSes and modem OSes and allows for them both to run on a single processor. This allows for threads from different OSes to be inter-twined in priority for scheduling so the hypervisor task scheduler can work in collaboration with existing sleep control code to implement this invention.

In summary, systems and methods according to the invention have provided mobile phone power saving without the need for major changes in any of the existing software or in the delivered functionality of 3rd party OSes. Furthermore, systems and methods according to the invention preferably do not require changes to any known hardware to save power.

A more specific statement of the invention may be as follows. Conventional hypervisor technology allows a single core to be designated for more than one application stack, so, theoretically, a device may require fewer processing cores than the same device without the hypervisor. Nevertheless, many devices continue to maintain a dedicated core processor for each individual application stack. In these devices, the invention provides systems and methods, which may include appropriately configured hypervisors, that select certain categories of tasks from each of a number of multiple application stacks and route the tasks in these categories to a predetermined processor core. Such selected task categories may include periodic tasks which are performed when the processors are in an idle state. By routing some or all periodic tasks from a number of different applications to a single processor, the invention avoids redundant power-cycling of processor cores.

The scope of the invention also extends to less than a full hypervisor takeover of the OSes and implementation of each of the OSes in a virtual machine. For example, only the code in the OS threads that are periodically woken up can be put on one core by shifting the code associated with these threads into one OS.

There are other processing cores in many phones which could also be made to work over the hypervisor so their respective wake-up threads can run on the one core. One example of another processing core is the GPS device which, in certain implementations, has periodic communication with the modem OS which would be optimized in terms of power consumption using this invention.

This invention may be yet further extended to other embedded devices that run off of a battery—an example may be a device with a WiFi core that has to wake to receive messages and another core that maintains a user display.

FIG. 1 shows a schematic diagram of a cell phone 150 that could be used for systems and methods according to the invention. Cell phone 150 preferably include components HSDPA Transmitter DAC 102, HSDPA RF Control 104, HSDPA RX ADC 106, EDGE[1] TX DAC 108, EDGE RF Control 110, and EDG RX ADC/DigiRF 112 (each of which forms a portion the hardware for converting the digital signal from the modem to an analogue RF signal for the antenna and vice-versa). WCDMA[2]/HSDPA RF subsystem 114, GSM/GPRS/EDGE subsystem 116, and antenna 118 are for establishing a connection between the phone and the cell.

[1] Enhanced Data rates for Global Evolution—EDGE uses the same spectrum allocated for GSM900, GSM1800 and GSM1900 operation. Instead of employing GMSK (Gaussian Minimum Shift Keying) EDGE uses 8PSK (8 Phase Shift Keying) producing a 3-bit word for every change in carrier phase. This effectively triples the data rate offered by GSM. The use of EDGE enables GSM to increase the data rates that can be offered to users of the GSM spectrum.
[2] WCDMA—Wideband Code Division Multiple Access—An ITU (International Telecommunications Union) standard derived from CDMA (Code Division Multiple Access) technology.

Applications Stack Processor 120, GSM/GPRS/EDGE/WCDMA/HSDPA Modem Stack Processor 122, WCDMA/HSDPA Modem 124 and GSM/GPRS/EDGE Modem DSP 126 are the core processing logic and further contain relevant mobile phone communications protocols.

Finally, components TV 128, IR (Infrared) 130, UART 132 (Universal Asynchronous Receiver/Transmitter—i.e., hardware that translates data between parallel and serial interfaces) external memory control 134, (U)SIM[3] 136, SDIO (Secure Digital Input/Output (SDIO) is a standard for devices that feature interchangeable memory options) 138, camera 140, LCD 142, GPIO/Keypad 144, USB interface 146, and audio 148 are all for connections to phone peripherals. 32 kHz XTAL 152 (an oscillator that uses a quartz crystal to generate a frequency) is coupled to PMU (Power Management Unit) which is, in turn, coupled to CLK (Clock) 156 and I2C Bus 158. Furthermore, battery 160, charger 162, backlight 164, and vibrator 168 (or other tactile feedback) are shown schematically for illustration.

[3] USIM—UMTS Subscriber Identity Module Usually referred to as a SIM card, the USIM (UMTS Subscriber Identity Module) is the user subscription to the UMTS mobile network. The USIM contains relevant information that enables access onto the subscribed operator's network.

Applications stack processor 120 and modem control processor 122 each represent a separate core processor. In one set of circumstances, processor 120 may receive a user inputted number and then receive a send command. Baseband processor may then transfer the inputted number to modem processor 122 in order to make the cell phone call. Each processor typically has an OS residing in its one respective Random Access Memory ("RAM"). Each respective processor provides services such as memory management, scheduling, etc. Accordingly, the phone shown schematically in FIG. 1 may provide a platform for implementation of software according to the invention as will be explained in more detail below.

Figure 2:
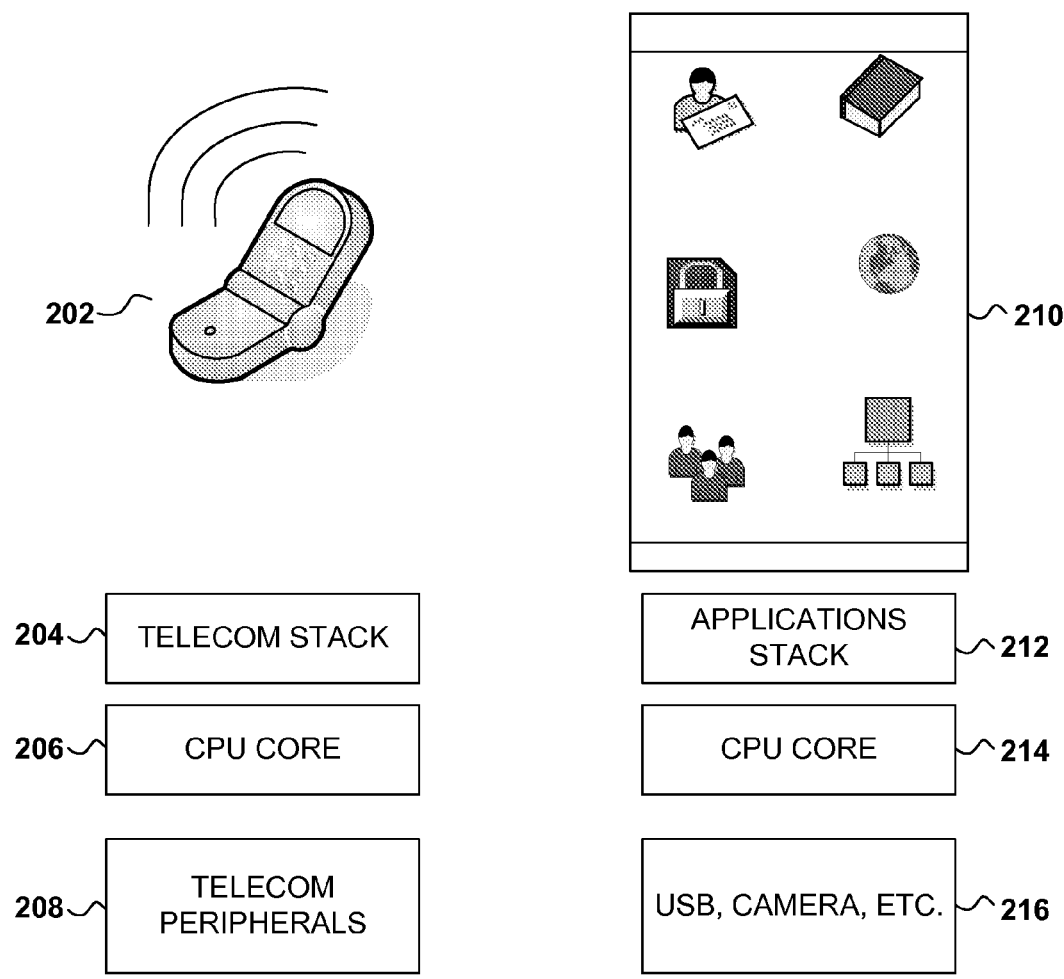
FIG. 2 shows another schematic diagram of a conventional cell phone.

FIG. 2 shows a schematic version of the conventional operation of a cell phone having two core processors 206 and 214, such as the cell phone schematically depicted in FIG. 1. The cell phone in FIG. 2 typically provides telecommunication operations as shown in 202 and other applications as shown at 210. As described in FIG. 1, the cell phone includes telecom stack 204 (alternatively referred to herein as a "modem stack"), to control the telecommunications operations, and applications stack 212 to control the other cell phone applications. Core processor 206 handles the processing functions required by telecom stack 204. These processing functions typically require interaction with the telecom peripherals 208. Core processor 214 handles the processing functions required by applications stack 212. These processing functions require interaction with the peripherals such as the USB port, the camera, etc. 216.

Figure 3:
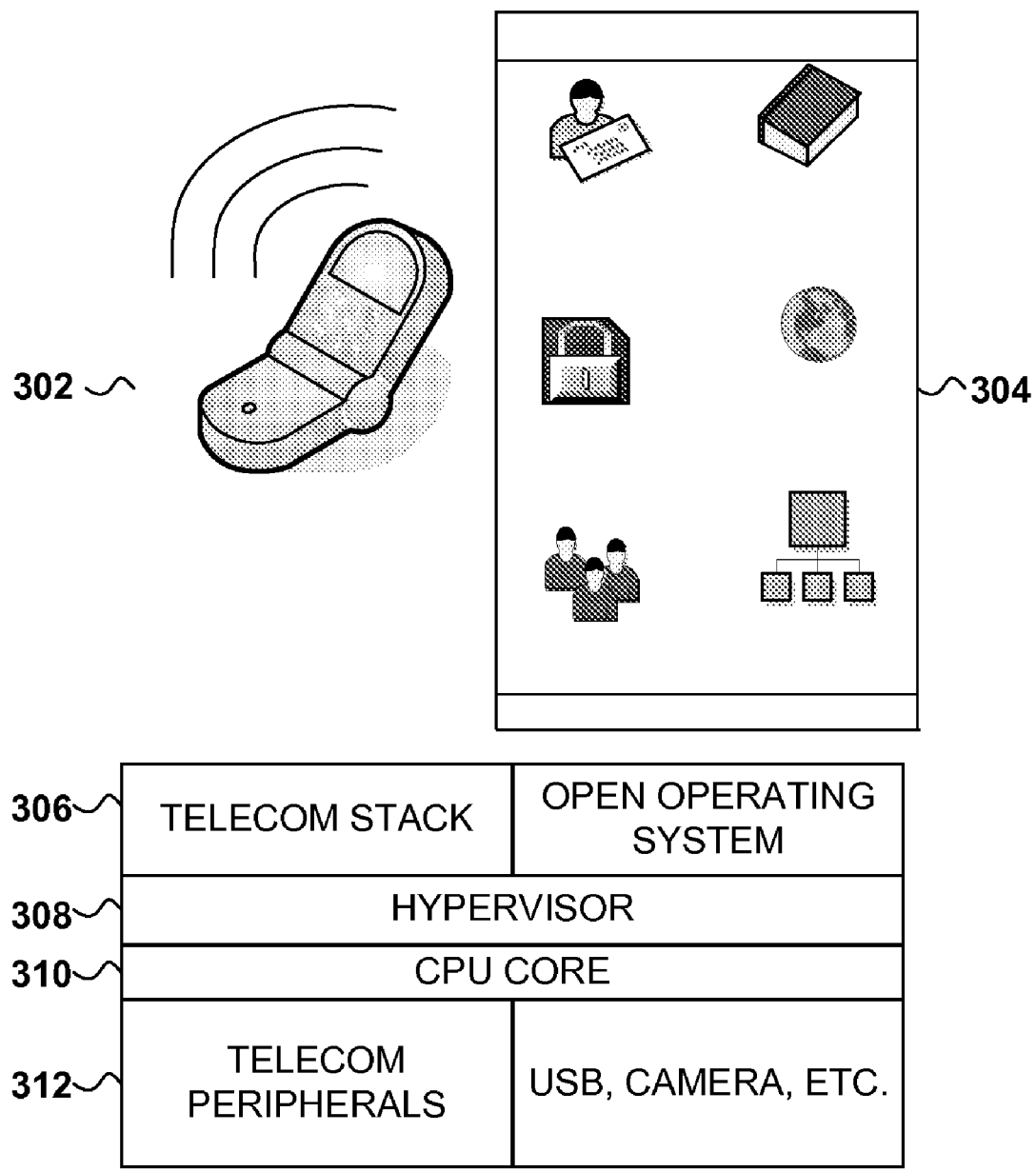
FIG. 3 shows a shows a schematic version of the conventional operation of a hypervisor.

FIG. 3 shows a schematic version of the conventional operation of a hypervisor. FIG. 3 includes the telecom operations, as shown in 302, the other applications, as shown at 304, the telecom stack, the applications stack, and a security stack (shown together at 306), the hypervisor 308, a single CPU core processor 310, and the various peripherals at 312.

Thus, hypervisor 308 has allowed for the removal of one of the CPU core processors. Accordingly, known hypervisor technology reduces bill of material for cell phones and may mitigate certain security concerns.

Thus, in certain conventional situations, hypervisors have been used to obviate the need for multiple processing cores.

Figure 4:
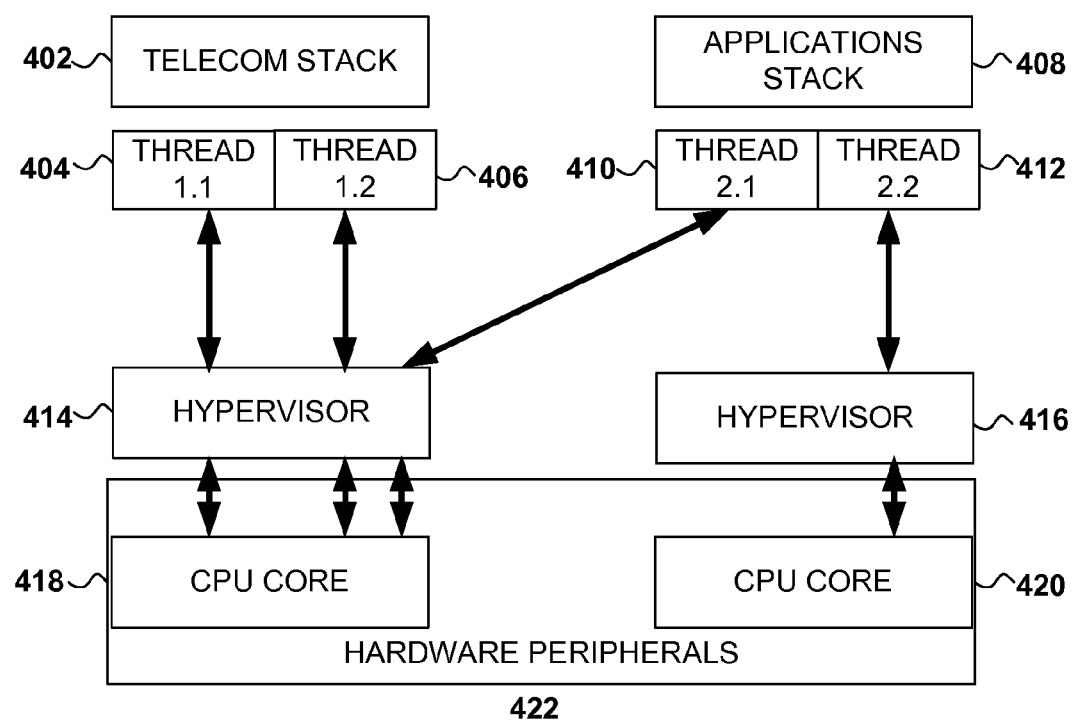
FIG. 4 shows a schematic diagram of a cell phone that may benefit from hypervisor technology according to the invention.

Nevertheless, certain cell phone platforms which continue to use multiple core processors may still benefit, according to the invention, from hypervisor technology. FIG. 4 shows a schematic diagram of a cell phone that may benefit from selectively-applied hypervisor technology according to the invention.

Telecom stack 402 preferably may implement processing threads 1.1 404 and 1.2 406. For the purposes of this application, processing threads indicate the communication between the application stack and the processing cores regarding tasks to be performed by the processing cores on behalf of the application stacks. Applications stack 408 may implement processing threads 2.1 410 and 2.2 412.

In a method according to the invention, threads 1.1 and 2.1 may be idle threads which are selected to run on core processor 418 whereas threads 1.2 and 2.2 may be non-idle threads which are selected to run on their own core processors, 418 and 420, respectively. A hypervisor instance runs over a single processor core and communicates with that core. Accordingly, hypervisor 414 is configured to run thread 2.1 410 on core 418. Hypervisor 414 preferably can run thread 2.1 410 on core 418 because the code for thread 2.1 410 resides in RAM which both hypervisors 414, 416 and cores 418, 420 have access to.

The selection of threads 1.1 and 2.1 may preferably be implemented in hypervisor 414, transparent to the operation of the application stacks 408.

Figure 5:
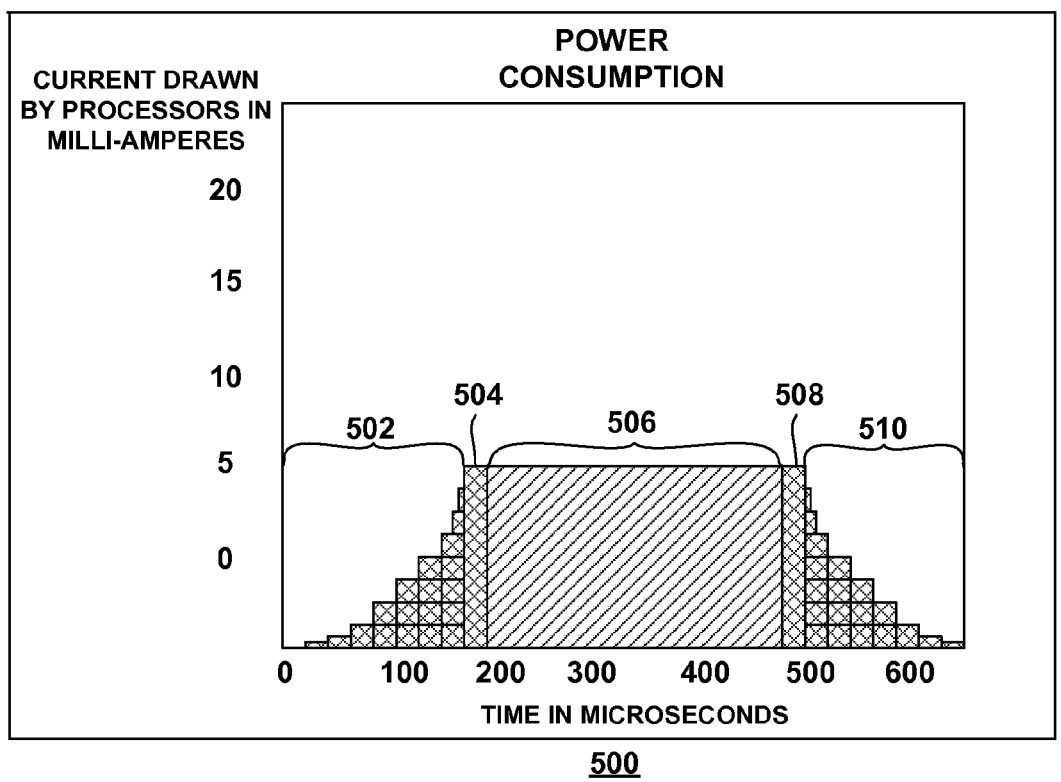
FIG. 5 shows a diagram of the power consumption over time for a conventional processor core.

FIG. 5 shows the relative advantage of such an implementation. FIG. 5 shows a diagram 500 of the power consumption over time for a conventional processor core. In area 502, a first amount of power is consumed when the core is waking up. For the purposes of this application, the power consumed by "waking up" a processor may include the power consumed by turning ON the processor, activating the memory associated with the processor, ramping up the processor clock (when the clock turns ON, it also takes time for the clock to settle) and other power consuming tasks associated with bringing a processor up to speed. Area 504 shows that, even after the core has reached a level at which it can operate, an additional amount of power is consumed prior to the core being fully operational. Area 506 shows the power consumed when the core is awake and fully functional.

Area 508 shows that when the core begins to return to sleep, the core continues to consume power at a high level even though it no longer operates at a level of being awake. For the purposes of this application, the power consumed by putting a processor "to sleep" may include the power consumed waiting for the memory to stop drawing current, the power consumed waiting for the clock to clear a hysteresis period, and the power consumed by the processor itself when it checks to make sure the processor has no tasks remaining, just to name a few exemplary power-consuming tasks performed by the processor when going to sleep. Finally, area 510 shows the power consumed when the core is returning to a sleep state.

It should be noted that the area (which represents total power consumption) under the entire power consumption curve, or some substantially similar curve, shown in FIG. 5 is required for each processor that needs to be awakened. Accordingly, a relatively large amount of power is wasted when two processors are woken up because all the unutilized power in areas 502, 504, 508, and 510 is duplicated without deriving any operational benefit.

Whereas conventional devices perform the same tasks on multiple processors, methods according to the invention, on the other hand, use a hypervisor to selectively route certain tasks to a single processor. In one embodiment of the invention such tasks may include tasks that are periodically performed when the device is in a sleep state. Such processes may be enabled at least through the implementation of hypervisor technology using multiple processor cores. The hypervisor technology preferably allows the direction of tasks to predetermined processors at least for the purposes of reducing power consumption.

Additional advantages obtained by the invention include increased speed when running the periodic tasks. The increased speed reduces power consumed by reducing the time that the processor is operating. The increased speed is obtained by not requiring inter-processor communication during the periodic tasks because only a single processor is performing the periodic tasks during idle state and any inter-stack communication is handled directly on that processor.

Figure 6:
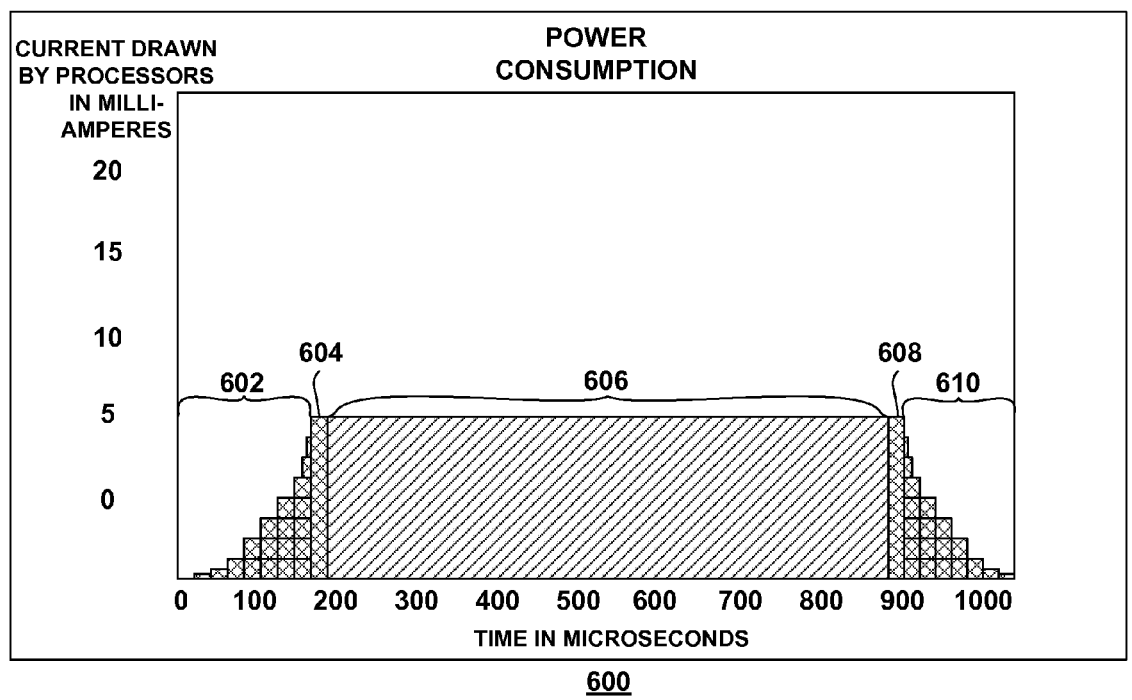
FIG. 6 shows a diagram of the power consumption over time for a processor core according to the invention.

FIG. 6 shows a diagram 600 of the power consumption over time for a processor core according to the invention. In area 602, the first amount of power consumed when the core is waking up is substantially equivalent to area 502. The amount of power consumed in area 604 the additional amount of power is consumed prior to the core being operational is substantially equivalent to area 504.

The true power savings, however, is evident in area 606. Area 606 extends over a substantially longer time than area 506 because area 606 represents the tasks that now are run from a single processor instead of dual processors. Accordingly, the power consumed by the single processor is greater. However, there is no additional power consumed by the wake-up and going to sleep of a second processor.

Furthermore, inter-processor communication is reduced to zero for the periodic tasks because a single processor is performing all the periodic tasks. For example, the application stacks need to talk to one another for certain periodic tasks. One such periodic task that requires interaction between the stacks is when the application stack requests information regarding the signal strength from the modem stack. The application stack may be requesting such information at least in order to update the signal strength display on the cell phone.

It should be noted that area 608, when the core continues to consume power at a high level even though it no longer operates at a level of being awake, may be substantially the same as area 508. Finally, area 610, the power consumed when the core is returning to a sleep state, may be substantially the same as area 510.

In certain embodiments of the invention, when one of the processors is selected to be the processor that provides the idle time periodic processing, the other processor(s) may be redesigned such that it can be put in a relatively lower state of power consumption during its respective sleep period—i.e., the secondary, less-used, processor(s) may be designed without a quick wake-up or a quick going to sleep time. Rather, the second processor can wake up more slowly and go to sleep more slowly than the first processor in order to save additional power. For the time period when the second processor is waking up and going to sleep, its tasks may be covered by the first processor, as needed. It should be noted as well that the memory for a relatively slow core typically uses less power than the memory for a relatively fast core. Accordingly, by moving all the low processing power tasks to the low power core, power used by external memory may be reduced.

Thus, it has been shown that, in a device that utilizes a hypervisor to allocate processing tasks between multiple processors, substantial power savings can be realized by running certain periodic tasks through a single processor.

It should be noted that while the description herein relates to cell phones, nevertheless, the systems and methods described relate readily to other devices that include multiple application stacks and multiple processing cores. One such category of device that may include multiple processing cores and perform periodic tasks during an idle state is a digital camera, or a digital video camera.

Many digital cameras are battery-powered. Accordingly, power consumption is an important factor in the design of such cameras. Furthermore, many digital cameras consume a large amount of power when idle. It would be advantageous, therefore, to implement systems and methods according to the invention as described herein for multi-processing core digital cameras and/or digital video cameras.

Other possible implementations of the invention may include multi-processor digital audio players such as MP3 players—e.g., the iPod manufactured by Apple Computer, Inc. of Cupertino, Calif., or other suitable, portable electronic device.

Figure 7:
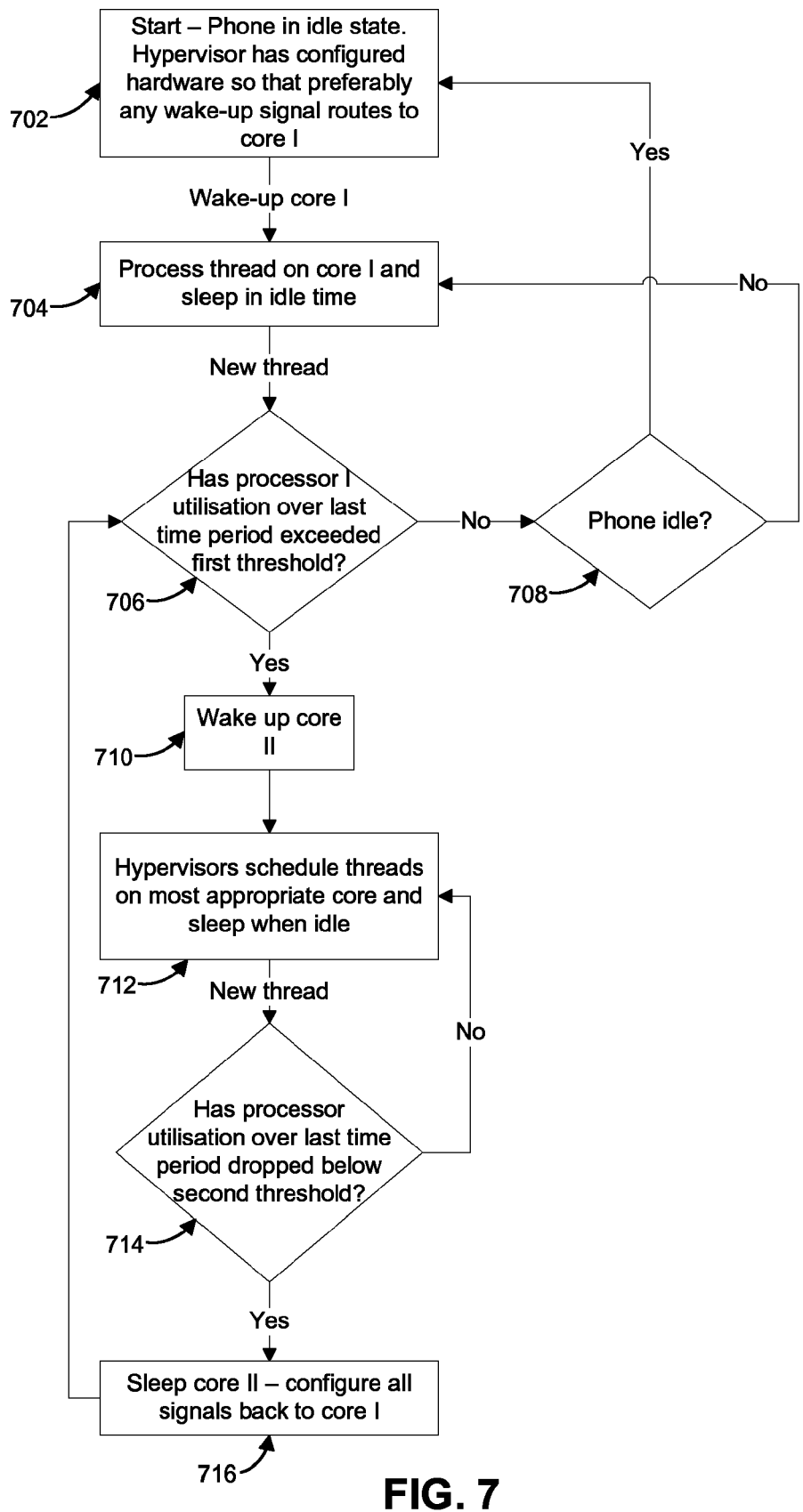
FIG. 7 shows an illustrative flow diagram of a method according to the invention.

FIG. 7 shows an illustrative flow diagram of a method according to the invention. The flow diagram is preferably implemented on a mobile phone that includes a hypervisor—alternatively referred to herein as a "hypervisor instance"—for each individual core (though the invention could also be implemented using a single hypervisor for multiple cores). Step 702 shows the phone in idle state. In certain embodiments of the invention, the hypervisor has configured hardware so that preferably any wake-up signal routes to core I. In the preferred embodiment of the invention, core I is the lowest power and lowest performance core.

When the user initiates performance of a function on the user's mobile phone, the phone transitions from idle mode and awakens core I. Step 704 shows that core I processes the thread and sleeps in idle time.

The hypervisor preferably monitors the processor utilization over a previous, preferably predetermined, time period. Step 706 shows that the hypervisor can query whether processor utilization of core I over a preceding amount of time has exceeded a threshold amount. The amount of time for the preceding time period can be configurable for optimal power saving/performance. It should be noted that, in order to increase efficient core utilization even more, the hypervisor can preferably dynamically adjust core usage as needed because the hypervisor itself controls thread scheduling and termination.

In alternative embodiments of the invention, the determinations may be made using instantaneous measurements of processing usage instead of, or in combination with, determinations over a preceding time period.

If the processing exceeds a first configurable threshold as determined in query 706 then the core I hypervisor instance will wake core II starting the core II hypervisor instance, as shown in step 710. If the processing power consumption is below the first configurable threshold, then the method may query whether the phone has returned to an idle state, as shown in step 708.

If the phone has returned to an idle state, then the flow may loop back to step 702 and await the next core I awakening event. If the phone has not returned to an idle state, then the flow may loop back to where core I continues to process as shown by the flow returning to the step shown in 704.

From step 710, the two hypervisor instances preferably communicate to schedule threads. Nevertheless, the modem threads may preferably be run on core I and UI threads run on core II to make inter-thread communications most efficient, as shown generally at step 712.

Step 714 shows that the hypervisors preferably continue to monitor utilization on each core and, if the total drops below a second threshold, the hypervisors, or other suitable software and/or hardware, can decide to route all new threads to core I and put core II back to sleep. In certain embodiments of the invention, the first threshold—i.e., the threshold required to awaken core II—corresponds to the same per processor power consumption as the threshold required to put core II to sleep. Thus, a mobile phone according to the invention may typically query whether the processing power consumption is above or below a first threshold.

It should be noted, however, that the first threshold and the second threshold may be at different levels of processing power consumption. Accordingly, it may require a higher (or lower) level of processing power consumption per processing core to awaken core II than it requires to put core II to sleep. Such an embodiment may preferable prevent a "hunting" phenomenon whereby the phone is turning core II on and off repeatedly when the phone processing power consumption hovers in the area of the threshold.

In certain embodiments of the invention, each of the processors may be evaluated separately to determine the utilization of each of the processors. The evaluation of each of the processors may be combined to form a processor utilization index. The processor utilization index may be used to determine whether to maintain one or both (or more) of the processors in an awakened state. In fact, any suitable combination of the utilization of each of the processors may be used to determine which of the processors should be maintained in an awakened state.

Figure 8:
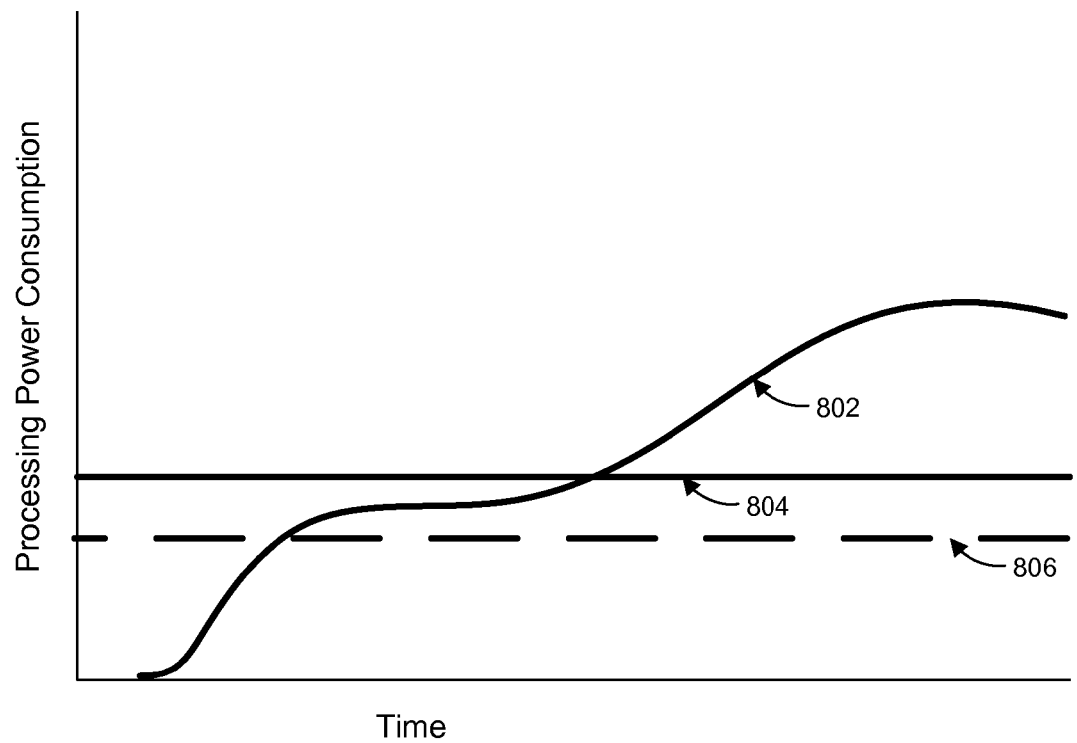
FIG. 8 shows a schematic diagram of an example of different thresholds of processing power consumption.

FIG. 8 shows a schematic diagram of an example of different thresholds of processing power consumption. The y-axis represents total processing power consumption for a mobile phone or other suitable device, while the x-axis represents time.

In the embodiment schematically shown in FIG. 8, a user make a normal voice call which takes the processing 802 from a very low level to a stable level of processing below a first threshold 804. In this case all the modem and UI threads will preferably be run on core I.

Then, if the user initiates a second application while still on the call, such as opening the phone's address book, the processing may exceed the first threshold 804 for operating only core I. (It should be noted that the utilization of core I should typically be maintained below 100% utilization of core I so as to not affect performance.) Core II is then awakened and the processing is then spread across core I and core II.

In certain embodiments of the invention, if the usage were to drop below the first threshold 804, core II could then be put to sleep. In other embodiments, a second threshold 806, the operation of which was described above, may be used in order to implement a level of hysteretic operation on the processing power consumption whereby core II will only go back to sleep after a relatively substantial drop in processing power consumption.

If the plurality of cores were to have an equal processing-to-power consumed ratio and no power was consumed waking up and going to sleep, then moving the threads around in the methods stated above would not save any power because the threads would run across the two cores quicker and therefore they would sleep for longer. However, the plurality of cores typically do not have an equal processing-to-power consumed ratio and power is consumed waking up and going to sleep. Specifically, the higher performance a processing core is—i.e., the higher the normal running speed of the core is—the more difficult the core is to put into a low power mode—i.e., a sleep mode—and its wake-up/sleep latency gets longer.

Figure 9A:
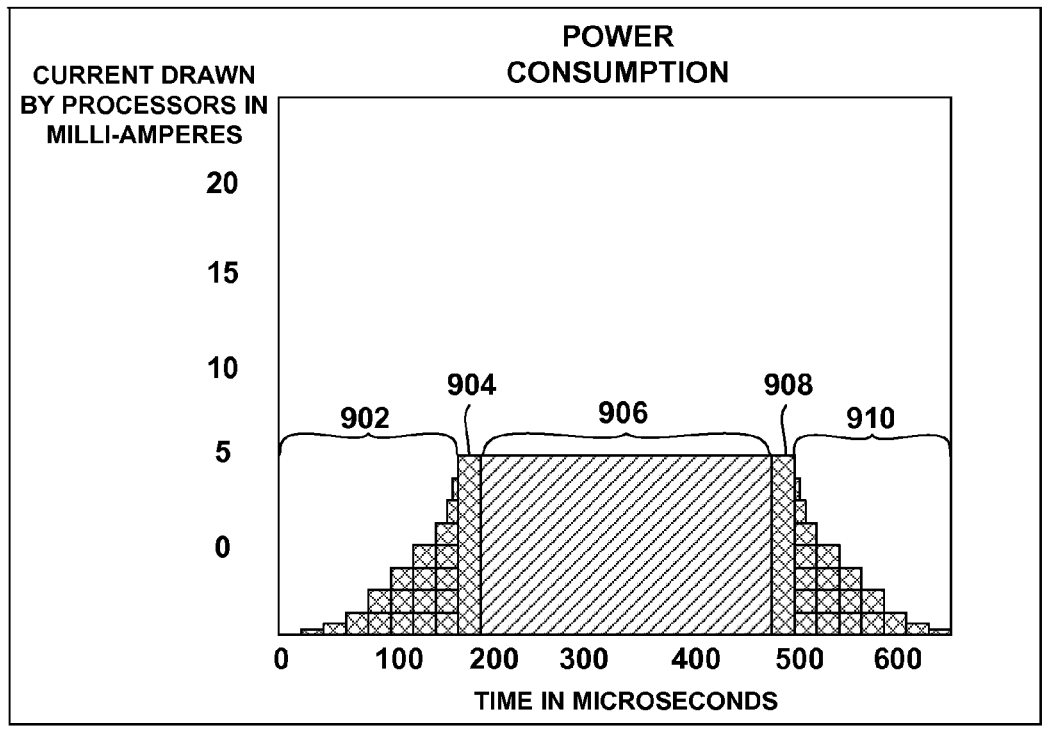
FIGS. 9A and 9B represent power consumption over time of a first and second processor.
Figure 9B:
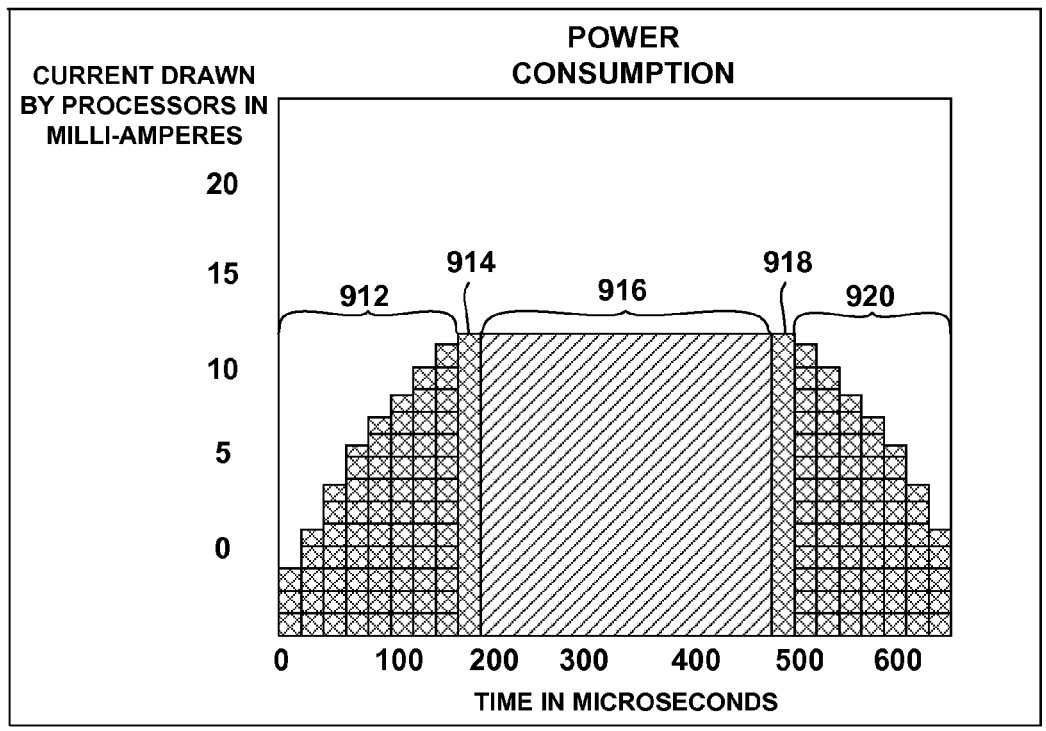

This principle is illustrated in the schematic diagrams shown in FIGS. 9A and 9B. FIG. 9A represents the power consumption of a first processor having a relatively lower power consumption and lower processing power. FIG. 9B shows the power consumption of a second processor having a relatively high power consumption and high processing power.

Areas 906 and 916 are the times during which useful processing is taking place for each of the different processors, respectively. As would be expected (albeit not shown)—the same thread running on core 1 will take longer, and may require less power, to complete than when running on core 2. Accordingly, there are some savings to be made using a slower processor when the task may be accomplished in a longer period of time.

However, these power savings are not significant. Rather, the main power saving according to the invention comes in the power consumed waking up and putting to sleep the processor during idle times when performing low processing-intensive tasks. For example, areas 902 and 910, which represent the power consumption of the processor in FIG. 9A when it is being awakened and put to sleep, are relatively much smaller (even taking into account the greater processing power of the processor shown in FIG. 9B) than the power consumption areas 912 and 916, which represent the power consumption of the processor in FIG. 9B when it is being awakened and put to sleep. In addition, the shape of the areas is typically more power friendly in the lower-power consuming cores than in the higher power-consuming cores because of the sacrifices necessary to attain high processing speeds.

Thus, the power consumed waking up and going to sleep for the low power processor is much smaller. Furthermore, by having only a single core (or some number less than a maximum number of cores) do all the processing, the single core is awake longer and should be doing less wake-up and sleep transitions. Therefore, the total power consumed for substantially all low processor intensive tasks will be substantially lower on just a single, preferably low processor power, core.

Areas 904 and 914 show that, even after the core has reached a level at which it can operate, an additional amount of power is consumed prior to the core being fully operational. Areas 908 and 918 show that when the core begins to return to sleep, the core temporarily continues to consume power at a high level even though it no longer operates at a level of being awake. During the time covered by areas 904/914 and 908/918, the state of the core is being transitioned using software running on the core from sleep to running tasks and running tasks to sleep. By using only the low-power core when possible, the total power consumed during these areas should be lower than power consumed by the higher power core or power consumed by a combination of both the high power core and the low power core.

In some embodiments of the invention, one does not need to use a full hypervisor (or multiple hypervisor instances) and run the OSes in a virtual machine to implement systems and methods according to the invention. Instead, the code in the threads that use a low amount of processing time could all be put on one core by simply shifting the code all into one OS. Nevertheless, this would require relatively larger coding changes in the OS than the other method using one or more hypervisors as described above.

Figure 10:
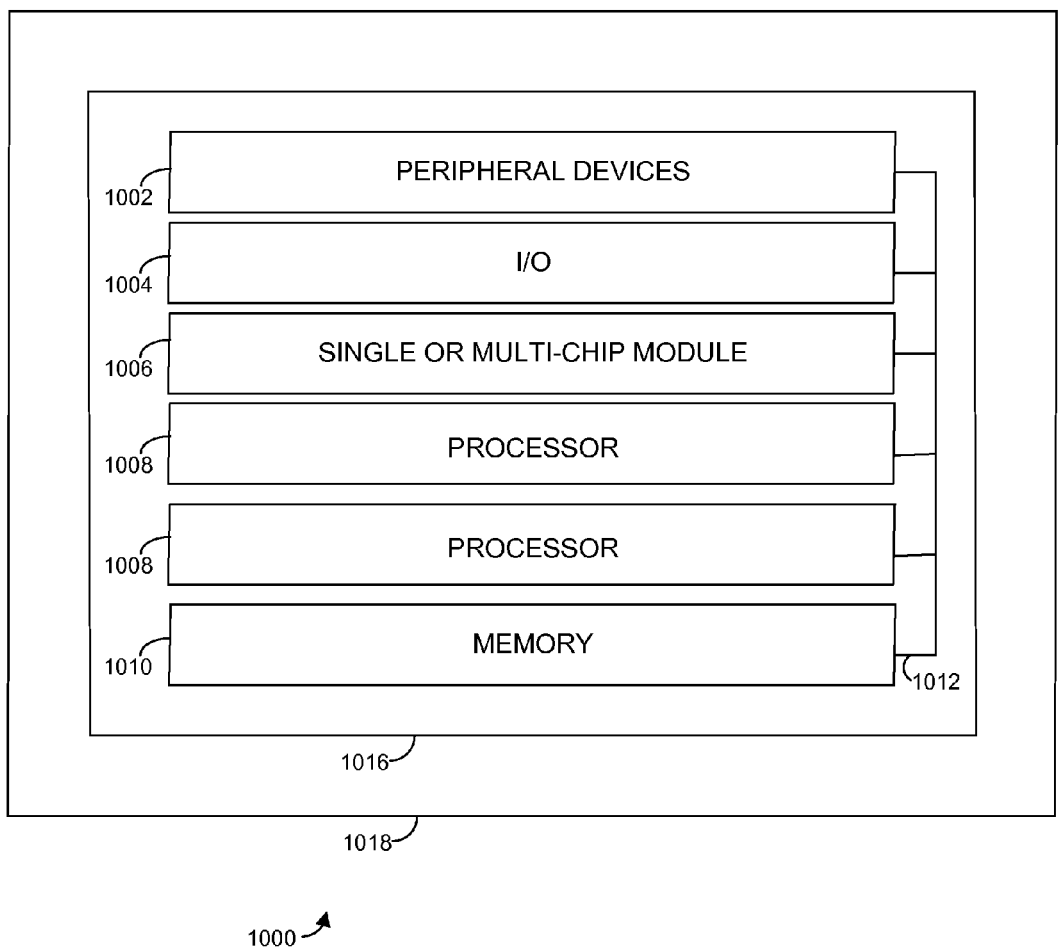
FIG. 10 shows a schematic diagram of an illustrative single or multi-chip module of this invention in a data processing system.

FIG. 10 shows a single or multi-chip module 1006 according to the invention, which can be one or more integrated circuits, in an illustrative data processing system 1000 according to the invention. Data processing system 1000 may include one or more of the following components: peripheral devices 1002, I/O circuitry 1004, multiple processing cores 1008 and memory 1010.

These components are coupled together by a system bus or other interconnections 1012 and are populated on a circuit board 1016 which is contained in an end-user system 1018. System 1000 is configured for use in a mobile phone according to the invention. While system 1000 represents a generic embedded device with multiple processing cores which, according to the invention can use a hypervisor to wake a single processor for idle tasks, nevertheless, it should be noted that system 1000 is only exemplary, and that the true scope and spirit of the invention should be indicated by the following claims.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional.

Thus, systems and methods for reducing power consumption in a mobile phone have been described. Persons skilled in the art will appreciate that the present invention can be practiced by other than the described embodiments, which are presented for purposes of illustration rather than of limitation, and the present invention is limited only by the claims which follow.

What is claimed is:

1. A mobile phone comprising:
    a plurality of application stacks;
    a plurality of processor cores, each of the application stacks corresponding to one of the plurality of processor cores; and
    a plurality of hypervisor instances, each of the hypervisor instances that corresponds to a single processor core;
    wherein:
        when total power consumption of the plurality of processor cores over a predetermined time period is below a threshold level, a first hypervisor instance allocates tasks from each of the application stacks to a first processor core;
        when power consumption of the plurality of processor cores over the predetermined time period is above the threshold level, the first hypervisor instance that causes a second processor core to awaken and to run a second hypervisor instance thereon, the second hypervisor instance for allocating selected tasks from the plurality of application stacks to the second processing core;
        the first processor core is characterized by relatively less power consumption than the second processor core; and
        the first processing core comprises a memory that stops drawing current following turn OFF relatively faster than the amount of time that a memory of the second processor core stops drawing current following turn OFF.

2. The mobile phone of claim 1 wherein the second hypervisor puts the second processing core into a lower power consumption state when the power consumption of the plurality of processor cores drops below the threshold.

3. The mobile phone of claim 1 wherein the second hypervisor puts the second processing core into a lower power consumption state when the power consumption of the plurality of processor cores drops below a second threshold.

4. The mobile phone of claim 3 wherein the first threshold represents a higher level of power consumption than the second threshold.

5. The mobile phone of claim 1 wherein the plurality of application stacks comprise at least two stacks selected from a software peripheral stack, a mobile TV stack, a modem stack, a Wi-Fi stack, and a Bluetooth stack.

6. The mobile phone of claim 1 wherein the first processing core comprises a turn-ON power consumption that that is less than the turn-ON power consumption of the other cores of the plurality of processing cores.

7. A method of conserving processor power in a mobile phone, the mobile phone comprising a plurality of processing cores, the method comprising:
    awakening a first processing core from a low power state in response to a thread associated with a first operating system (OS);
    processing the thread associated with the first OS using the first processing core;
    processing a thread associated with a second OS using the first processing core;
    determining whether utilization of the first processing core over a first time period has exceeded a predetermined threshold; and
    if utilization of the first processing core over a first time period has exceeded a predetermined threshold, awakening a second processing core from a low power state;
    wherein:
        the first processor core is characterized by relatively less power consumption than the second processor core; and
        the first processing core comprises a memory that stops drawing current following turn OFF relatively faster than the amount of time that a memory of the second processor core stops drawing current following turn OFF.

8. The method of claim 7 further comprising, if the utilization of the first processing core over the first time period did not exceed the threshold, determining whether the first processing core can be but in the low power state.

9. The method of claim 7 further comprising, following the awakening of the second processing core, scheduling a plurality of OS threads on each of the first processing core and the second processing core.

10. The method of claim 7 further comprising:
    following the awakening of the second processing core, determining whether the collective utilization of the first processing core and the second processing core over a second predetermined time period has dropped below the first threshold; and
    if the collective utilization has dropped below the first threshold, placing the second processing core in a lower power state.

11. The method of claim 7 further comprising:
    following the awakening of the second processing core, determining whether the collective utilization of the first processing core and the second processing core over a second predetermined time period has dropped below a second threshold, the second threshold being a lower processing utilization per core than the first threshold; and
    if the collective utilization has dropped below the second threshold, then placing the second processing core in a lower power state.

12. An electronic device comprising:
    a plurality of application stacks;
    a plurality of processor cores; and
    a hypervisor;
    wherein, when total power consumption of the plurality of processor cores over a predetermined time period is below a threshold level, the hypervisor allocates processing tasks from the plurality of application stacks to a first processor core, and, when power consumption of the plurality of processor cores over the predetermined time period is above the threshold level, the hypervisor awakens a second processing core and allocates selected processing tasks from the plurality of application stacks to the second processing core; and
    wherein:

the first processor core is characterized by relatively less power consumption than the second processor core; and
the first processing core comprises a memory that stops drawing current following turn OFF faster than the amount of time that a memory of the other of the plurality of processing cores stops drawing current following turn OFF.

13. The electronic device of claim 12 wherein the hypervisor puts the second processing core to sleep when the power consumption of the plurality of processor cores drops below a second threshold.

14. The electronic device of claim 13 wherein the threshold represents a higher level of power consumption than the second threshold.

15. The electronic device of claim 12 wherein the first processing core comprises a turn-ON power consumption that that is shorter than the turn-ON power consumption of the other cores of the plurality of processing cores.

16. The electronic device of claim 12 wherein the hypervisor puts the second processing core to sleep when the power consumption of the plurality of processor cores drops below the threshold.

17. The electronic device of claim 12, the device further comprising a mobile phone.

18. The electronic device of claim 12, the device further comprising a digital camera.

19. The electronic device of claim 12, the device further comprising a digital audio player.

* * * * *